Jan. 15, 1957

H. G. FEISSEL 2,777,945

PULSE PRODUCING SYSTEM WITH INTERRELATED REPETITION FREQUENCIES

Filed Jan. 13, 1953

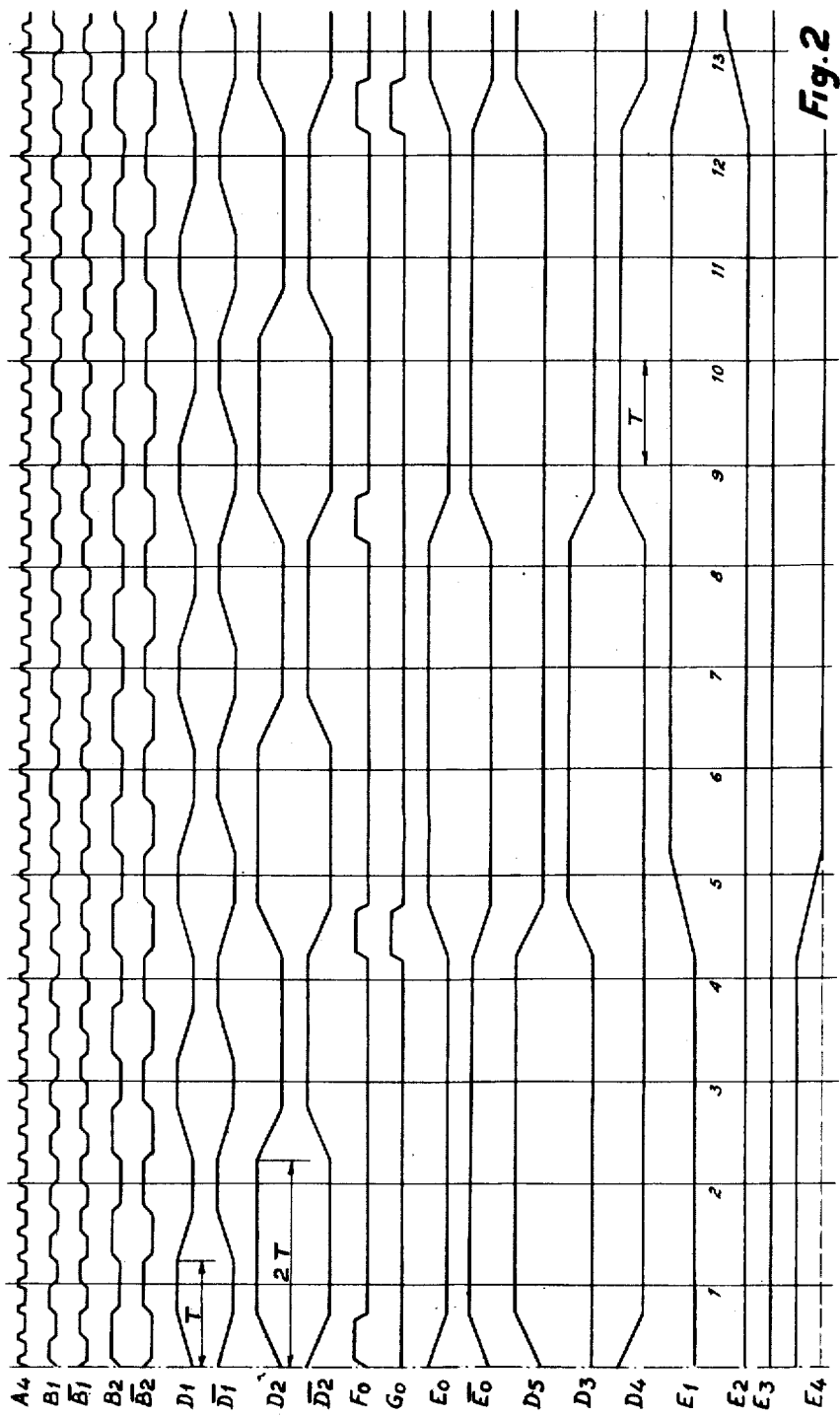

Jan. 15, 1957     H. G. FEISSEL     2,777,945
PULSE PRODUCING SYSTEM WITH INTERRELATED REPETITION FREQUENCIES
Filed Jan. 13, 1953     7 Sheets-Sheet 3
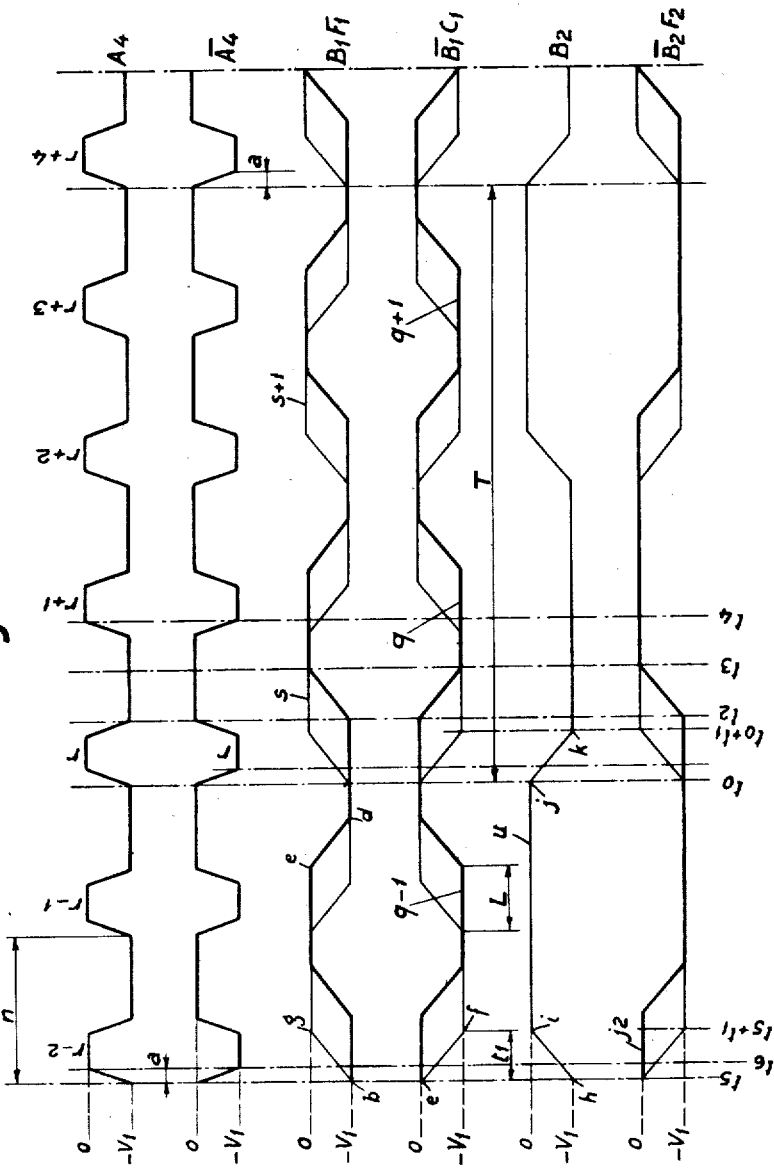
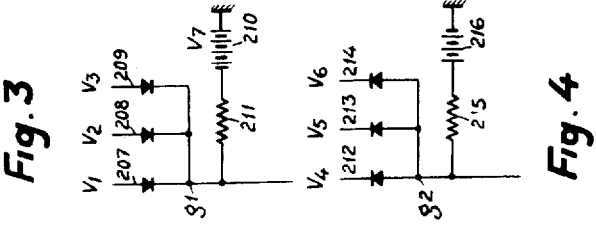

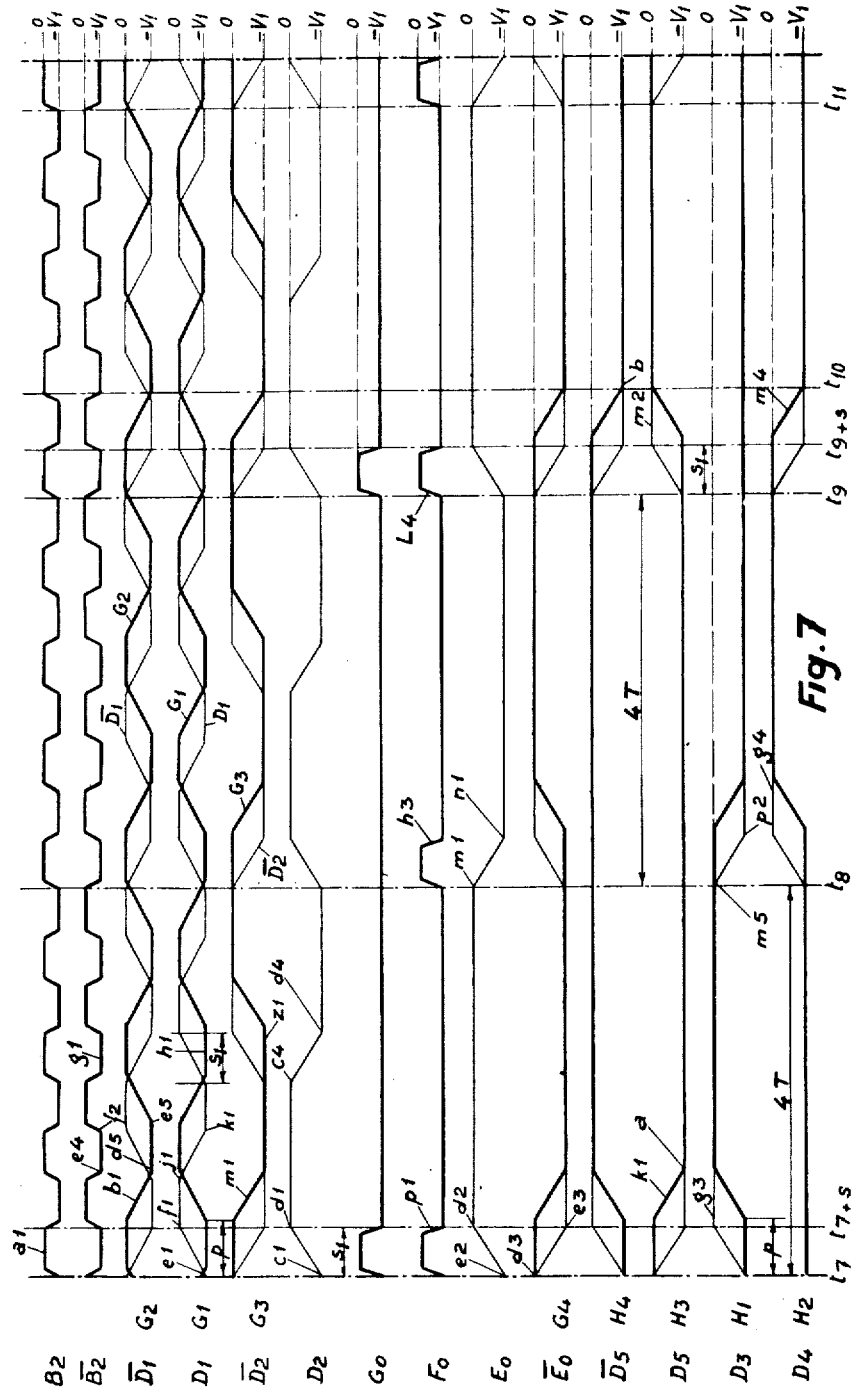

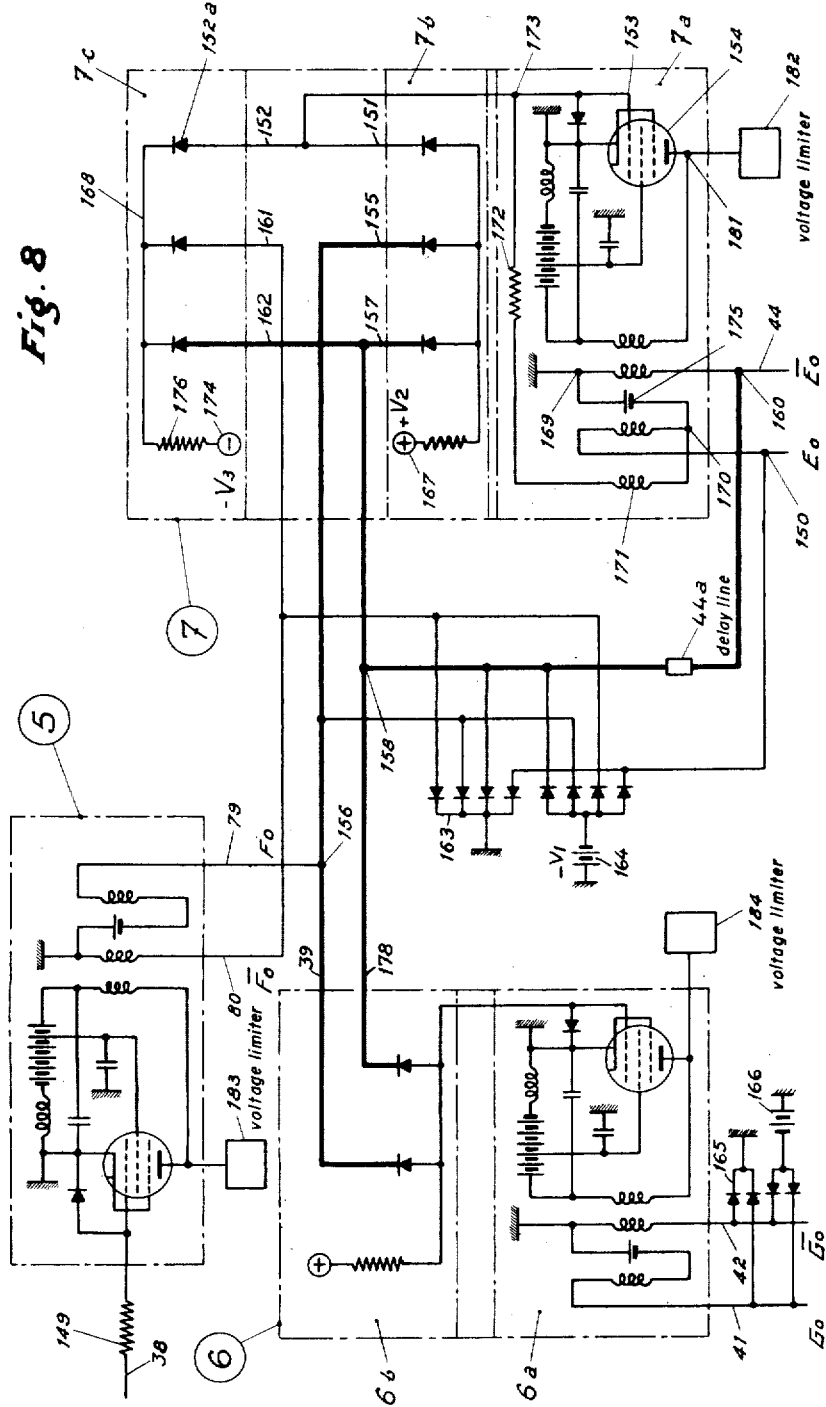

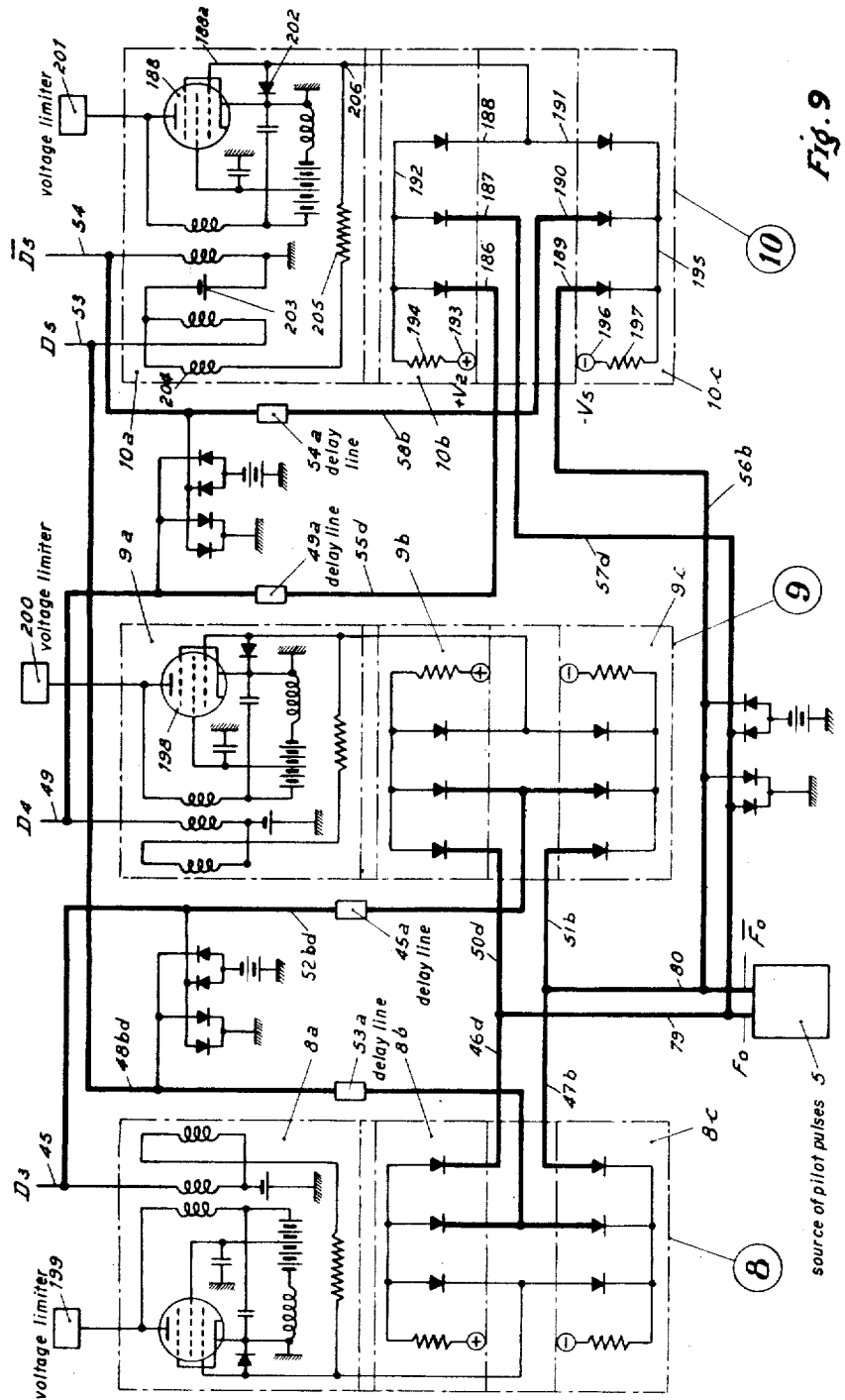

United States Patent Office 2,777,945
Patented Jan. 15, 1957

2,777,945

PULSE PRODUCING SYSTEM WITH INTER-RELATED REPETITION FREQUENCIES

Henri Gerard Feissel, Paris, France, assignor to Compagnie des Machines Bull, Paris, France (Societe Anonyme)

Application January 13, 1953, Serial No. 331,060

Claims priority, application France January 24, 1952

12 Claims. (Cl. 250—27)

The present invention refers to a system of interconnected impulse generators, certain of which permit the obtaining of timing impulse trains, from two trains of pilot impulses applied to one of the generators, and others the obtaining of auxiliary impulse trains. The repetition periods and the time length of the impulses of the timing trains, are respectively whole multiples of the repetition period and of the time length of the pilot impulses, which is not true for the auxiliary impulse trains, which are used for the production of certain timing trains. All the generators of the system are able to emit two impulse trains each, for which the graphic representations, in a system of Cartesian-co-ordinates are symmetrical to one another, with respect to an axis which is parallel to the time axis, and passes at half height through the impulses of one train. These two trains will hereinafter be called symmetrical trains, and will be designated by the terms $N$ and $\bar{N}$. Train $N$ is by definition an impulse starting train, and train $\bar{N}$, an impulse blocking train, the letter N being chosen merely as an example.

More precisely, the system according to the present invention, is able, by the use of $n$ generators, to provide $n$ pairs of symmetrical timing impulse trains, which, as has been stated above, are derived from two trains of symmetrical pilot impulses. This system is divided into successive timing generator stages, which correspond respectively to repetition frequencies which are decreasing sub-multiples of the repetition frequency of the pilot impulses, this system being characterized by the fact that the beginning and the end of an impulse of any repetition frequency of $F_n$ are controlled respectively by two coincidence detectors, associated to the corresponding generator. The detector which is concerned with the beginning of the impulse, reacts to the coincidence of at least two impulses, of which one is a delayed impulse of a repetition frequency $F_n$, while the other belongs to a first frequency train $nF_n$ which is a whole multiple of $F_n$. The other detector, which is concerned with the end of the impulse, reacts to the coincidence of at least two impulses, of which one is a delayed impulse having a frequency $F_n$, and the other is an impulse of a second train, having a repetition frequency $nF_n$, symmetrical with the first.

The system according to the invention, includes at least one stage, called auxiliary, which produces two auxiliary symmetrical impulse trains. This stage is inserted between two successive timing generator stages and is characterized by the fact that the repetition frequency of the auxiliary trains is a whole multiple of the frequency of the trains produced by the stage of highest rank, to which it is connected.

Other characteristics of the invention will be set forth hereinafter, when describing a manner of realization of this system, which is merely a non-restrictive example.

In the appended diagrams, included by way of example,

Fig. 1 diagrammatically shows the various impulse generators, and the connections which cause the starting and the blocking of their emissions;

Fig. 2 shows impulse trains which are produced by the generators described in Fig. 1;

Fig. 3 shows a buffer;

Fig. 4 shows a gate;

Fig. 6 shows certain impulse trains, as mentioned in Fig. 2, which are produced by the generators mentioned in Fig. 5;

Fig. 7 shows impulse trains produced by the generators described in Figs. 8 and 9;

Fig. 8 represents a generator unit, which is able to provide the two pairs of auxiliary impulse trains $F_0$ and $\bar{F}_0$, $G_0$ and $\bar{G}_0$, and the timing impulse trains $E_0$ and $\bar{E}_0$;

Fig. 9 shows three impulse generators which provide the three timing impulse trains $D_3$, $D_4$ and $D_5$ respectively.

Figure 1:
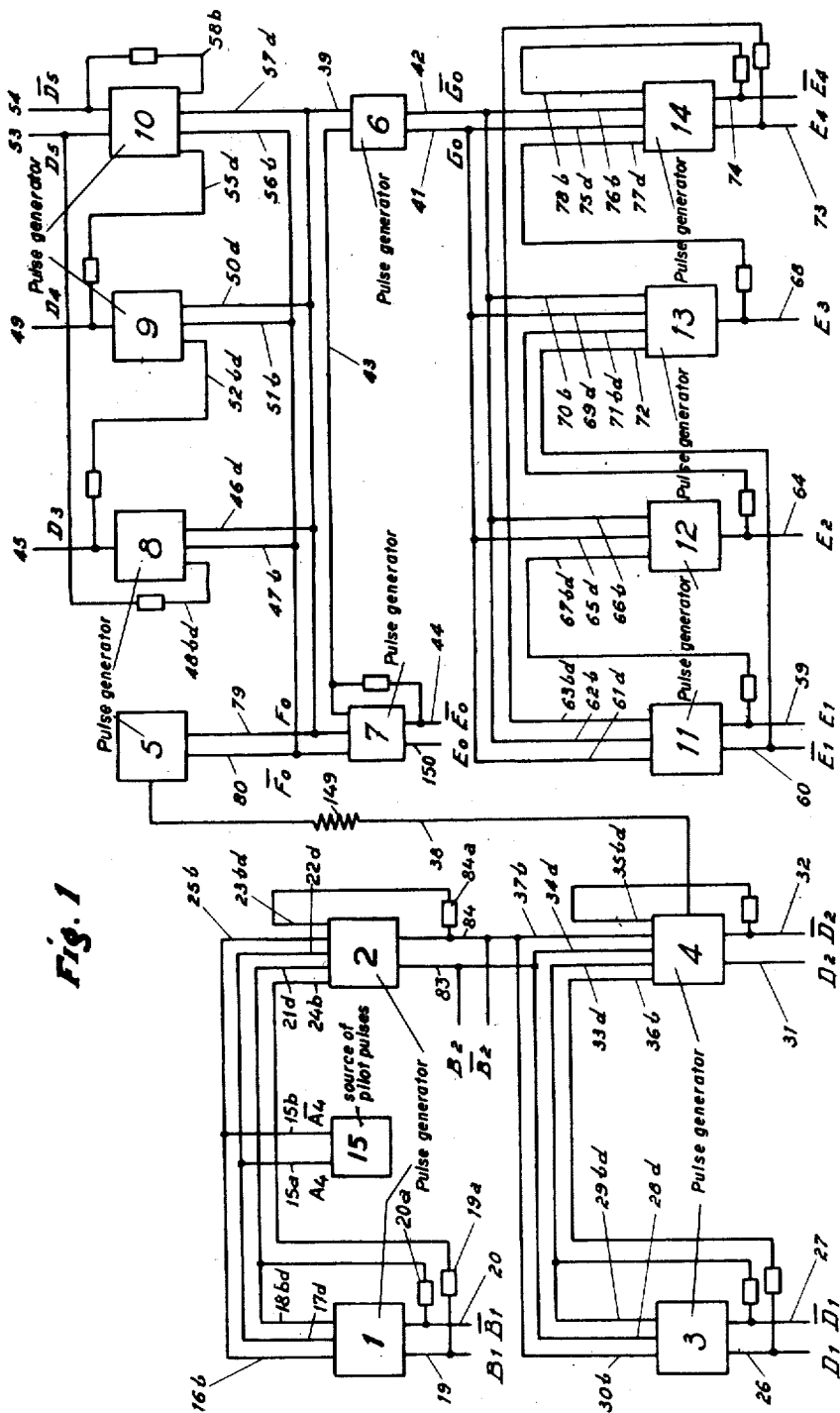

Figure 1 very diagrammatically shows a device which is able to provide impulse trains, of which certain are represented versus time in Fig. 2. In Fig. 1, the coincidence detectors of the various generators are not shown. This device includes 14 impulse generators numbered from 1 to 14. Generators 1, 2, 3, 4 and 5, respectively furnish timing trains $B_1$ and $\bar{B}_1$, $B_2$ and $\bar{B}_2$, $D_1$ and $\bar{D}_1$, and $D_2$ and $\bar{D}_2$, and the auxiliary trains $F_0$ (see Fig. 2) and $\bar{F}_0$, the latter are used for starting and blocking the sending of three timing trains, $D_3$, $D_4$ and $D_5$, and of the two timing trains $E_0$ and $\bar{E}_0$. Timing generators 1 and 2, are connected to the output of generator 15, by certain of their inputs, this generator emits the symmetrical trains of pilot impulses $A_4$, and $\bar{A}_4$, train $A_4$ being the only one shown in Fig. 2. In like manner certain inputs of generators 3 and 4, are connected to the output of generator 2. Generators 6, 7, 8, 9 and 10, which furnish impulse trains $G_0$ and $\bar{G}_0$, $E_0$ and $\bar{E}_0$, $D_3$, $D_4$, $D_5$ and $\bar{D}_5$, respectively, are connected in parallel to the two outputs of generator 5. Trains $\bar{G}_0$ and $D_5$, are not shown in Fig. 2. Auxiliary trains $G_0$ and $\bar{G}_0$ are used respectively, for starting and blocking the emission of timing impulse trains $E_1$, $E_2$, $E_3$, $E_4$ (see Fig. 2). Actually, timing generators 11, 12, 13 and 14, which furnish impulse trains $E_1$ and $\bar{E}_1$, $E_2$, $E_3$, $E_4$ and $\bar{E}_4$, respectively are connected in parallel to the two outputs of generator 6, through the coincidence detectors with which they are equipped.

In Fig. 2, may be seen equidistant vertical lines, numbered 1 to 13. The interval separating any two consecutive lines corresponds to a time $T$. It may be seen that the repetition period of the $A_4$ impulses is equal to $$\frac{T}{4}$$

while the $B_1$ and $\bar{B}_1$ impulses have a time length $$\frac{T}{4}$$

and a repetition period $$\frac{T}{2}$$

The $B_2$ and $\bar{B}_2$ impulses have a time length $$\frac{T}{2}$$

and a repetition period $T$. Impulses $D_1$ and $\bar{D}_1$ have an individual time length $T$, and repetition period $2T$. The $D_2$ and $\bar{D}_2$ impulses have a time length $2T$, and a repetition period $4T$. The $F_0$ impulses have a repetition period 4T. The $G_0$ and $E_0$ impulses have a repetition period equal to 8T. The time length of the $F_0$ and $G_0$ impulses is approximately equal to $$\frac{T}{2}$$

while the time length of the $E_0$ and $\overline{E_0}$ impulses is equal to 4T. The impulses of the $D_5$, $D_3$, and $D_4$ trains have a time length equal to 4T, and a repetition period equal to 12T. Three consecutive impulses of the three D trains, which succeed one another in the order here mentioned, are so constructed, that either of the two last ones represents a delay equal to 4T, with relation to the preceding one.

The impulses of the $E_1$, $E_2$, $E_3$ and $E_4$ trains, have a time length equal to 8T, and a repetition period equal to 32T. Four consecutive impulses of the four E trains which succeed one another in the order here mentioned, are so constructed, that any one of the last three represents a delay equal to 8T, in relation to the preceding one. With all the generators shown in Fig. 1, the impulses are produced by an electronic discharge vacuum tube. In the twelve timing generators, 1, 2, 3, 4, 7, 8, 9, 10, 11, 12, 13 and 14, the voltage of the control grid of the tube, is controlled by a pair of coincidence detectors. Each pair of coincidence detectors includes a gate and a buffer. These detectors have been described on page 511 and following of the issue of May 1950 of the "Proceedings of the I. R. E." The gates and buffers which make up one manner of realization of the coincidence detectors are of known type.

Figure 3 shows a buffer having three inputs, 207, 208 and 209, each of which includes a rectifier cell, these inputs being connected, by means of $g_1$ and resistor 211, to the negative terminal, of voltage $V_7$, of source 210, connected to the ground by its positive terminal. Resistor 211, may be for example a thousand times greater than the resistance of the cells, if measured in the direct direction.

If to inputs 207, 208 and 209 voltages are applied whose algebraic values $V_1$, $V_2$ and $V_3$ are far greater than $V_7$, and if $V_1 > V_2 > V_3$, point $g_1$ automatically assumes a voltage which is slightly less than $V_1$. If $V_1 = V_2 = V_3$, point $g_1$ remains at the voltage $V_1$, this is why a buffer acts as a coincidence detector, what ever the number of its inputs may be.

Figure 4 shows a gate having three inputs, 212, 213, and 214. It differs from the buffer described in Fig. 3, only in that the arrangement of the cells is reversed, as are the connections of source 210 with the ground and the resistor. In this arrangement, if $V_4$, $V_5$ and $V_6$ are the algebraic values of the voltages of the three inputs, with $V_4 > V_5 > V_6$, the voltage of $g_2$: $V_{g_2}$, is automatically slightly greater than $V_6$. If $V_4 = V_5 = V_6$, $V_{g_2} = V_4$ is obtained. Each gate causes the beginning of the corresponding impulses, while the associated buffer causes the end. The gate of a timing generator A, of a repetition frequency $F_A$, is characterized by the fact that in steady state operations, the emission which it causes, is due to the coexistance of at least one positive starting impulse, having a repetition frequency $nF_A$, $n$ being equal to two, three, or four, and of a delayed impulse of a frequency $F_A$. This latter may be provided by generator A, or by another generator C. The impulses of repetition frequency $nF_A$ are furnished by a generator D.

When $n$ is equal to three, the timing generator A is part of the group 8, 9, 10. When $n$ is equal to four, generator A is part of group (11, 12, 13, 14). When this generator A has been part of the first group (8, 9, 10) generator D is the auxiliary generator 5. When it is part of the second group (11, 12, 13, 14), generator D is the auxiliary generator 6. When $n$ is equal to two, generator A is one of the generators 1, 2, 3, 4, or 7. Each of the generators 1, 2 and 3 sends impulses to the generator for which the reference number is immediately greater than its own, in the series here given, and generator 5 feeds generators 6 and 7.

Every buffer incorporated in timing generator B, of a repetition frequency $F_B$, is characterized by the fact that in steady state operation, its action is caused by the coexistence of a delayed impulse, which has a repetition frequency $F_B$ and is furnished by generator B, or by another generator M, and of at least another negative blocking impulse, which has a repetition frequency $nF_B$ and is furnished by a generator G, the number $n$ being equal to two, three or four. When $n$ is equal to three or to four, generator G, is one of the auxiliary generators 5 or 6.

The coincidence detectors of generators 1 to 14, are not shown in Fig. 1, this however does not prevent the verification of the rules hereinabove given, concerning the connections of the gates and buffers to generators other than those of which they are a part. In this figure, the inputs of the various generators bear the index mark $d$, when they are connected to the input of a gate, index $b$, when they are connected to the input of a buffer, and index $bd$, when they are common to a gate and a buffer. It is seen that timing generator 1, of a repetition frequency $$\frac{2}{T}$$

which includes one gate and one buffer, has three inputs, 16$b$, 17$d$, 18$bd$, and two outputs 19 and 20, which furnish $B_1$ and $\overline{B_1}$ impulses respectively. At these outputs, delay lines 19$a$ and 20$a$ are respectively connected. In accordance with the operation of the gates and buffers as hereabove given, it may be observed that input 18$b$ actually furnishes the gate and buffer with a delay impulse, having a repetition frequency of $$\frac{2}{T}$$

while the two other inputs furnish them respectively with symmetrical impulses having a repetition frequency equal to $$2 \times \frac{2}{T} = \frac{4}{T}$$

Generator 2, having a repetition frequency equal to $$\frac{1}{T}$$

has a gate with three inputs 21$d$, 22$d$ and 23$bd$. These three inputs lead the retarded $\overline{B_1}$ impulses, and delayed $A_4$ and $\overline{B_2}$ impulses. Moreover, the $\overline{B_1}$ impulses have a repetition frequency equal to $$\frac{2}{T}$$

and the $A_4$ impulses have a repetition frequency equal to $$\frac{4}{T}$$

The buffer of generator 2, also has three inputs, 24$b$, 25$b$, and 23$bd$, which lead the delayed $B_1$ impulses, and $\overline{A_4}$ and $\overline{B_2}$, delayed by delay line 84$a$, respectively. The rules here given are therefore respected as concerns generators 1 and 2. This generator furnishes $B_2$ and $\overline{B_2}$ impulses to its outputs 83 and 84. It may be verified, that the other generators also follow the preceding rules. Generator 3 emits $D_1$ and $\overline{D_1}$ impulses, by its outputs 26 and 27. Its gate receives $B_2$ impulses and delayed $\overline{D_1}$ impulses, while its buffer receives $\overline{B_2}$ impulses, and delayed $D_1$ impulses.

Generator 4, which emits $D_2$ and $\overline{D_2}$ impulses by its outputs 31 and 32, has a gate which receives delayed $\overline{D_1}$ impulses, $B_2$ impulses, and delayed $\overline{D_2}$ impulses. The buffer of this generator receives delayed $D_1$ impulses, and delayed $B_2$ and $\overline{D_2}$ impulses. Generator 5, connected to generator 4, by connection 38, furnishes $F_0$ and $\overline{F_0}$ impulses by its outputs 79 and 80. Generator 7, receives delayed $F_0$, $\overline{F_0}$, and $\overline{E_0}$ impulses. It furnishes $E_0$ and $\overline{E_0}$ impulses. Generator 6, which by its input 39, receives $F_0$ impulses, and furnishes $G_0$ and $\overline{G_0}$ impulses by its outputs 41 and 42, receives delayed $\overline{E_0}$ impulses at a second input 43.

Generator 8, which furnishes $D_3$ impulses, by its output 45, receives $F_0$ and $\overline{F_0}$ impulses at its inputs 46$d$, and 57$b$, and at a third input 48$bd$, receives delayed $D_5$ impulses.

Generator 9, which by its output 49 furnishes $D_4$ impulses, receives the $F_0$ and $\overline{F_0}$ impulses at its inputs 50$d$, and 51$b$, and at a third input 52$bd$, receives delayed $D_3$ impulses.

Generator 10, which by its outputs 53 and 54, furnishes $D_5$ and $\overline{D_5}$ impulses receives delayed $D_4$ impulses, $F_0$ and $\overline{F_0}$ impulses, and delayed $\overline{D_5}$ impulses, at its four inputs 55$d$, 56$b$, 57$d$, and 58$b$ respectively.

Generator 11, which by its outputs 59 and 60 furnishes $E_1$ and $\overline{E_1}$ impulses receives $G_0$ and $\overline{G_0}$ impulses at two inputs 61$d$ and 62$b$, and at a third input 63$bd$, receives delayed $E_4$ impulses.

Generator 12, which furnishes $E_2$ impulses by its output 64, receives the $G_0$ and $\overline{G_0}$ impulses at two inputs, 65$d$ and 66$b$, and at a third input 67$bd$, receives delayed $E_1$ impulses.

Generator 13, which by its output 68 furnishes $E_3$ impulses receives the $G_0$ and $\overline{G_0}$ impulses, at two inputs 69$d$ and 70$d$, and at input 71$bd$, receives delayed $E_2$ impulses, and at its input 72, receives $\overline{E_1}$ impulses. The purpose of this fourth input is to prevent generators 11 and 13 from operating in synchronism. Actually, at the starting, generators 11 and 14 run the chance of emitting synchronous impulses, which are greater than the required frequency, if no measures for preventing synchronism between two of them are taken.

Generator 14, which furnishes $E_4$ and $\overline{E_4}$ impulses, by its outputs 73 and 74, receives the $G_0$ and $\overline{G_0}$ impulses at two inputs, 75$d$ and 76$b$, and at two other inputs 77$d$ and 78$b$, receives delayed $E_3$ and $\overline{E_4}$ impulses.

Figure 5:
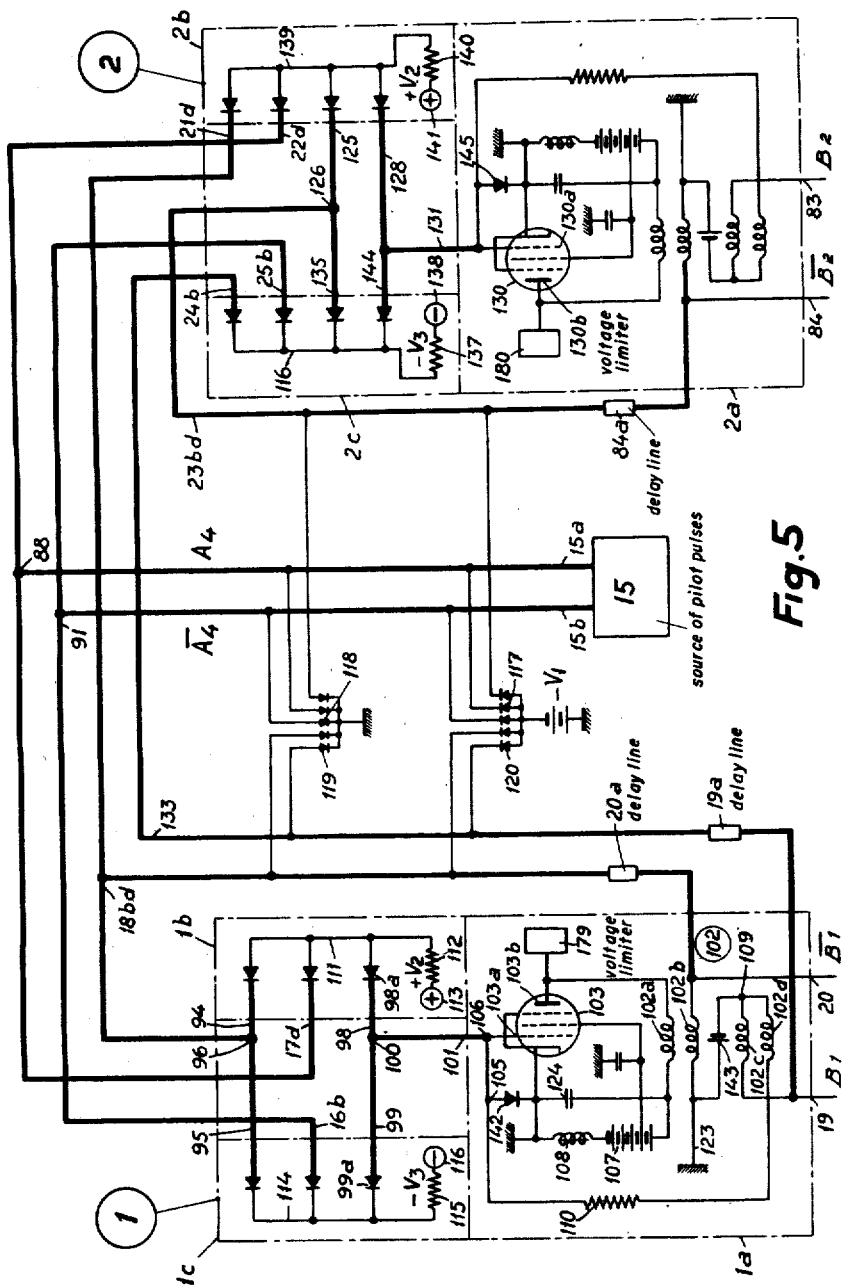
Fig. 5 shows two generators of which each provides one pair of timing impulse trains, $B_1$ and $\bar{B}_1$, and $B_2$ and $\bar{B}_2$ respectively.

Figure 5, wherein elements which are identical to those in Figure 1 bear the same reference numbers, represents a diagram of the arrangement of the aforementioned generators 1 and 2, which are outlined by dot-dash rectangles. Generator 1 includes an electronic amplifier 1$a$, a gate 1$b$, and a buffer 1$c$, which are also outlined by dot-dash rectangles, and are connected to one another. This generator is able to provide $B_1$ and $\overline{B_1}$ impulse trains at its two outputs 19 and 20. Generator 2 also includes an electronic amplifier 2$a$, a gate 2$b$ and a buffer 2$c$, which are outlined by dot-dash rectangles. Voltage limiters 119 and 120, connected to outputs 19, 20 and 84, through delay lines 19$a$, 20$a$ and 84$a$, maintain the voltages of these outputs within the limits of zero and $-V_1$.

A pilot impulse source 15 furnishes output 15$a$ with the starting impulse train $A_4$ and at its second output 15$b$, furnishes blocking impulse train $\overline{A_4}$ (see $A_4$ impulses in Fig. 2). This source 15 was described in a U. S. patent application, entitled "Pulse Generator and Distributor," filed on July 2, 1952, Serial Number 296,967. At 88 output 15$a$ is connected to inputs 17$d$ and 22$d$ of gates 1$b$ and 2$b$. At 91, output 15$b$ is connected to inputs 16$b$ and 25$b$ of buffers 1$c$ and 2$c$. Voltage limiters 117 and 118 connected to outputs 15$a$ and 15$b$, maintain the voltages of these outputs within the limits of zero and $-V_1$. Output 20 of generator 1 is connected to voltage limiters 119 and 120 which are similar to limiters 118 and 117, and is also connected to gates 1$b$ and 2$b$, as well as to buffer 1$c$. Output 19 of the same generator is connected to buffer 2$c$, and two voltage limiters 119 and 120. Input 98 of gate 1$b$, and input 99 of buffer 1$c$, are at 100 connected to input 101 of electronic amplifier 1$a$. Source 113 of gate 1$b$ furnishes a voltage $+V_2$, and source 116 of buffer 1$c$ produces a voltage $-V_3$, which is much lower than $-V_1$. By way of example, $-V_1 = 4$ v. and $-V_3 = -130$ v. Voltage $+V_2$ is much higher than 0 volts. Amplifier 1$a$ includes only one feedback stage, of which the load impedance is made up of a transformer 102. Primary 102$a$ of this latter is in the cathode plate-circuit of a pentode 103, of which the control grid 103$a$ is connected to inputs 98 and 99 of gate 1$b$ and of buffer 1$c$ by connection 100—106—101. This grid is connected to the ground by rectifier cell 142. A voltage limiter 179, of known type, connected to anode 103$b$ of pentode 103, maintains the voltage of this anode within two limited values. Transformer 102 has three secondary windings 102$b$, 102$c$, 102$d$, wound in the same direction. The first, 102$b$, is connected to the ground at 123. A continuous current source 107, of weak interior resistance is included in the cathode-plate circuit of pentode 103, in series with an inductance coil 108, which acts as a stopper for the alternative currents. The combination 107—108 is shunted by condenser 124, the reactance for used frequencies of which is negligible. At its other extremity 20, winding 102$b$ may furnish $\overline{B_1}$ impulses (see Figure 2) for reasons which will be explained hereinafter.

The second secondary winding 102$c$ is connected to the ground through source 143, which has a potential $-V_1$, by its extremity 109, and may therefore furnish its other extremity with positive $B_1$ impulses (see Figure 2).

The third secondary winding 102$d$ of transformer 102 is included in the connection 109, 110, 106, 103$a$, which includes resistor 110. This connection constitutes a feedback network which is designed for holding control grid 103$a$ of pentode 103 at a voltage essentially equal to zero, for a certain time after the end of the positive impulse sent to grid 103$a$ by the connection 100—101—106. This holding time as will be seen later on, is established by the intensity of emission of the aforementioned network in buffer 1$c$.

The operation of generator 1 will now be considered with the support of Figures 5 and 6. From top to bottom, Figure 6 shows impulse trains $A_4$, $\overline{A_4}$, $B_1$ and $F_1$, $\overline{B_1}$ and $C_1$, $B_2$, $\overline{B_2}$ and $\overline{F_2}$ represented V$s$ time of which some are represented in Fig. 2.

Train $C_1$, which is represented on the same abscissa axis as train $\overline{B_1}$ by impulses $q$, $(q+1)$, $(q+2)$, etc. ... which are marked in heavy lines, is deduced from train $\overline{B_1}$ by a delay $L$, which is slightly greater than the time length $t_1$ of the leading edge of a $\overline{B_1}$ impulse. This $L$ delay is peculiar to delay lines 19$a$, 20$a$, 84$a$. If one assumes that instant $t_0$ marks the beginning of an $r$ impulse of train $A_4$, it is seen that at a preceding instant $(t_0-a)$, $a$ being equal to the time length of the leading edge of an $A_4$ impulse, inputs 16$b$ and 95 of buffer 1$c$ are at a zero voltage, as input 94 of gate 1$b$. At the same instant, input 17$d$ of this gate is at a voltage $-V_1$, and the voltage $V_{98}$ and $V_{99}$ of inputs 98 and 99 are equal to $-V_0$, greater than $-V_1/2$. Actually, source 143 furnishes current along the circuit 123—ground-ground-142—105—110—109, and the value of the reverse resistance of rectifier cell 142, which is preferably made up of a germanium diode, is quite superior to the resistance of resistor 110. Source 113 furnishes current at input 17d, at instant $(t_0-a)$, and its circuit is closed by limiter 117, which is connected to the ground. From instant $(t_0+a-W)$ on, W being less than $a$, when $V_{17}=-V_0$, source 113 simultaneously furnishes current at inputs 17d and 98. It is to be noted that, at time $t_0$, the source 143 supplies energy neither into the gate Ab, for $V_{111}=-V_1$, nor into the buffer 1c for $V_{114}=0$, so that the voltage of line 142, 105, 106, 100, 99 is only limited by the rectifying element 98a of the gate 1b. From the instant $(t_{70}+a-W)$ to the instant $(t_0+a)$ the internal resistance of the element 98a gets lower and finally becomes negligible in relation to the resistance 110. Therefore, the voltage of the said control grid increases from $-V_0$ to 0 in the time interval W. As the pulse trains $A_4$ and $\overline{A_4}$ are symmetrical, to a voltage $-V_0$ at the input 17d of the gate 1b corresponds a voltage $(-V_1+V_0)$ at the input 16b of the buffer 1c for at every time the instantaneous voltages $v_1$ and $v_2$ of the trains $A_4$ and $\overline{A_4}$ verify the relation $$\frac{V_1+V_2}{2}=\frac{-V_1}{2}$$

From instant $T_0$ to instant $(t_0+a)$, an increase in the current intensity is therefore produced in the cathode-plate circuit 124—102a—103b of pentode 103, which causes the arrival of the positive leading edge of impulse $s$ of train $B_1$ at ouput 19, which leading edge is similar to $bg$, and at output 20, those of a negative leading edge similar to $ef$. The beginning of the delayed negative leading edge is formed at 94 at instant $t_2=t_0+L$ when impulse $r$ ends so that from this instant on, line 111 of gate 1b is brought to voltage $-V_1$. At the same instant, the feedback network 109—102d—110—106, which maintains grid 103a at a voltage near zero sends $A_4$ impulses to source 116 of buffer 1c which is parallel to input 16b, and to the aforementioned input 95. From instant $t_3=t_0+t_1=L$, when the base of the delayed negative leading edge arrives at input 96, the network sends current into this source which is parallel to input 16b. At instant $t_4$, when impulse $A_4$, numbered $(r+1)$ reaches the voltage of 0 volt, inputs 16b and 95 of buffer 1c are at voltage $-V_1$, so that only the feedback network feeds source 116 which causes a great enought voltage drop in resistor 110, for control grid 103a to be momentarily brought back to a voltage $-V_2$, which is less than $-V_1$. During impulse $(r+1)$ of train $A_4$, the negative leading edge $ed$ of the $B_1$ impulse of rank $s$, may therefore be observed. The successive stages of the formation of impulse $s$ of train $B_1$ are summarized in the following table:

| Instants | 95 | 16b | 99 | 114 | 17d | 98 | 94 | 111 |
| --- | --- | --- | --- | --- | --- | --- | --- | --- |
| $t_0-a$ | 0 | 0 | $-V_0$ | 0 | $-V_0$ | $-V_0$ | 0 | $-V_1$ |
| $t_0+a-W$ | 0 | $-V_1+V_0$ | $-V_0$ | 0 | $-V_0$ | $-V_0$ | 0 | $-V_0$ |
| $t_0+a$ | 0 | $-V_1$ | 0 | 0 | 0 | 0 | 0 | 0 |
| $t_2$ | 0 | 0 | 0 | 0 | $-V_1$ | 0 | 0 | $-V_1$ |
| $t_3$ | $-V_1$ | 0 | 0 | 0 | $-V_1$ | 0 | $-V_1$ | $-V_1$ |
| $t_4$ | $-V_1$ | $-V_1$ | $-V_1$ | $-V_1$ | 0 | $-V_1$ | $-V_1$ | $-V_1$ |

Impulse $A_4$ of rank $(r+2)$ gives rise to a B impulse of rank $(s+1)$ and impulse $(r+3)$ of train $A_4$ brings about the end of impulse $(s+1)$. The phenomena are periodical.

The manner of obtaining the $B_2$ and $\overline{B_2}$ impulse trains in generator 2, from $A_4$ and $\overline{A_4}$ trains, and from $B_1$ and $\overline{B_1}$ trains will now be shown. Gate 2b and buffer 2c of this generator each have four inputs. Inputs 125 of gate 2b and 135 of buffer 2c are connected to output 84 of the $\overline{B_2}$ impulses by the connection 126—23bd—84a. Input 128 of gate 2b and input 144 of buffer 2c are connected to control grid 130a of pentode 130 of amplifier 2a, by connection 128—131, connected to the ground through a rectifier cell 145. Input 24b of buffer 2c is connected to output 19 of the $B_1$ impulses, by the connection 19—133, which includes delay line 19a. Line 116 of buffer 2c is connected by resistor 137 to a source 138, of which the negative voltage is $-V_3$. Line 139 of gate 2b is connected in like manner to a source 141 of which the positive voltage is $+V_2$. Amplifier 2a is similar to amplifier 1a. Anode 130b of pentode 130 is connected to a voltage limiter 180, which is similar to limiter 179, herein mentioned. During the steady state operation of generator 2, impulse $j_2$ of impulse train $F_2$ of Figure 6, deduced from the $\overline{B_2}$ train by a lag L which is produced by delay line 84a, is furnished at gate 2b, and at buffer 2c at instant $t_5$ when impulse $(r-2)$ of timing $A_4$ begins. At this same instant, input 21d of gate 2b, which does not yet receive impulse $(q-1)$ of the train $C_1$, is also at a zero voltage and line 139 is at a voltage $-V_1$. At instant $t_6=t_5+a$, inputs 21d, 22d, and 125 are at the potential zero volt, so that the voltage of control grid 130a passes suddenly from $-V_0$ to zero volt, and so that from instant $t_5$ to instant $(t_5+t_1)$ the positive leading edge $hi$ of impulse $u$ of train $B_2$ is obtained. The negative leading edge $jk$ of this impulse is formed during the time interval $(t_0+t_1)-t_0$. At instant $(t_0+a)$ when the minimum voltage of impulse $\overline{A_4}$, of rank $r$ is reached, inputs 25b, 24b, and 135 are brought to voltage $-V_1$. Only the feedback network of amplifier 2a then sends current to source 138, and the voltage of grid 130a is lowered to below $-V_1$. Another $B_2$ impulse begins at instant $(t_5+T)$ and ends at instant $(t_6+T)$ for reasons previously explained. A train of periodic impulses $B_2$ is therefore obtained.

The arrangement for the obtaining of impulse trains $D_1$ and $\overline{D_1}$, $D_2$ and $\overline{D_2}$ from trains $B_2$ and $\overline{B_2}$ is essentially identical to the arrangement shown in Fig. 5. In other words, if impulse train $B_2$ is sent by output 15a of generator 15, and the impulse train $\overline{B_2}$ by output 15b, impulse trains $D_1$ and $\overline{D_1}$ are obtained at outputs 19 and 20, and trains $D_2$ and $\overline{D_2}$ at outputs 83 and 84, if delay lines 19a, 20a, and 84a are given a delay value $p$, slightly greater than time length $s_1$ of the leading edges of impulses $D_1$ and $D_2$.

Figure 7 shows on a smaller scale than the Fig. 6 diagrams, trains $B_2$ and $\overline{B_2}$, $D_1$ and $\overline{D_1}$, $D_2$ and $\overline{D_2}$, $G_0$ and $F_0$, $E_0$ and $\overline{E_0}$, $\overline{D_5}$ and $D_5$, $D_3$, $D_4$, as well as the trains which are staggered by a time $p$:$G_1$ deduced from $D_1$, $G_2$ deduced from $\overline{D_2}$, $G_3$ deduced from $D_2$, $G_4$ deduced from $E_0$, $H_4$ deduced from $\overline{D_5}$, $H_3$ deduced from $D_5$, $H_1$ deduced from $D_3$, $H_2$ deduced from $D_4$. These staggered trains are represented in heavy lines, and the other in light lines. In examining Figure 7, it is seen that the coexistence of impulse $a_1$ of train $B_2$ and of impulse $b_1$ of train $G_2$ causes the creation of positive leading edge $e_1f_1$ of an impulse $D_1$, from instant $t_7$ to instant $(t_7+s)$. The negative leading edge $j_1k_1$ of this impulse is produced by the coexistence of a negative impulse $e_4f_2$ of train $B_2$, and the absence of a $G_2$ train impulse during time $d_5e_5$. In like manner, the positive leading edge $c_1d_1$ of a $D_2$ impulse is produced from instant $t_7$ to instant $(t_7-s)$ by the coexistence of an $a_1$ impulse of train $B_2$ and a $b_1$ impulse of train $G_2$ and with an $m_1$ impulse of train $G_3$. The negative leading edge $C_4d_4$ of this impulse is produced by the coincidence of the $g_1$ impulse of the $\overline{B_2}$ train and the absence of impulses $h_1$ and $z_1$ of the $G_1$ and $G_3$ trains. It has been herein indicated that from instant $t_6$ to instant $(t_6+t_1)$ derivation line 139 of gate 2b of Figure 5 is brought to a voltage of zero volt. For similar reasons, the derivation line of gate 4b of generator 4 which controls the generation of the $D_2$ impulses is brought to a zero voltage, periodically, during the time intervals $s_1$, which are counted from instant $t_7$, $t_8$ ... etc. onward. Fig. 8 represents the arrangement of generators 5, 6, 7, which provide impulse trains $F_0$ and $\overline{F_0}$, $G_0$ and $\overline{G_0}$, $E_0$ and $\overline{E_0}$ (see Figure 2) respectively. The organs and connections which correspond to one another in Figures 1 and 8, bear the same reference numbers. Input 38 of generator 5 is connected through resistor 149, to the derivation line of generator 4, which corresponds to head 139 of generator 2. Outputs 79 and 80 are connected to generators 6 and 7 as has been herein indicated concerning Figures 1.

This generator differs from amplifiers 1a and 2a only in that it does not include a feedback circuit. The duration of its output impulses is equal to the duration $t_1$ of the impulses applied to its input, one of which coincides in Figure 6 with the positive leading edge $h_i$ of the first shown positive impulse of train $B_2$ when starting from the left. These indications are also true for generator 6, which is described further on.

Generator 7 includes a gate 7b, a buffer 7c and an amplifier 7a, which are respectively identical to gate 1b, to buffer 1c and to the amplifier 1a of Fig. 3. This generator provides the $E_0$ and $\overline{E_0}$ impulse trains at its outputs 44 and 150. The anode of pentode 154 of amplifier 7a is connected at 181 to a voltage limiter 182, which is similar to limiter 179 of amplifier 1a (Figure 3).

Generator 6 includes a gate 6b and an amplifier 6a, which differs from aforementioned amplifier 1a, in that it has no counter-feedback network. It provides the $G_0$ and $\overline{G_0}$ impulses at its outputs 41 and 42.

Inputs 151 and 152 of gate 7b and of buffer 7c are connected to control grid 153 of pentode 154 of amplifier 7a.

Input 155 of gate 7b receives $F_0$ impulses from the aforementioned output 79.

Input 162 of buffer 7c, and input 157 of gate 7b are connected to output 44 of generator 7 by connection 158—44a—160.

Voltage limiters 163 and 164 maintain the voltages of outputs 79, 80, 158 and 150 within the limits of 0 and $-V_1$. Other limiters 165 and 166, which are connected in shunt on outputs 41 and 42, maintain the voltages of these outputs within the aforementioned limits.

Generator 5 and amplifier 6a are respectively provided with anodic voltage limiters 183 and 184, which are similar to limiter 182 of amplifier 7a.

Input 161 of buffer 7c receives the $\overline{F_0}$ impulses from output 80.

If the starting of generator 7 is examined, with the support of Fig. 7, it is seen that at instant $t_7$, slightly before the reception of an $F_0$ impulse, which is assumed to be the first, input 155 of gate 7b is at a voltage $-V_1$, its input 151 at a voltage between 0 and $-V_1$ and its input 157 at zero. At instant $(t_7+a)$, $a$ being equal to the time length of the leading edge of an $F_0$ impulse, source 167, of positive voltage $+V_2$, which originally sent current to input 155, of which the voltage has become equal to zero, sends a current to input 151, of which the voltage suddenly increases to a value near zero, for reasons similar to those which have been herein indicated when describing the operation of generator 1. Consequently, from instant $t_7$ to instant $(t_7+s)$, output 150 of generator 7 delivers the positive leading edge $e_2d_2$ of a first $E_0$ impulse and output 44 delivers the negative leading edge $d_3e_3$ of the corresponding $\overline{E_0}$ impulse. Since the delay value of delay line 44a is equal to $p$ (see Fig. 4), input 162 of buffer 7c is at a voltage $-V_1$, at instant $(t_8-a)$, before arrival of the second $F_0$ impulse, but its input 161 is at 0 potential, as is the derivation line of the latter. At this moment, source 174, of voltage $-V_3$ is connected by resistor 176 to output 80 and to terminal 173 of feedback network 169, 170, 171, 172, 173 of amplifier 7a. On the other hand, at instant $(t_8+a)$, when the second $\overline{F_0}$ impulse reaches its minimum voltage $-V_1$, only the feedback network already mentioned sends current for an extremely short time, into source 174, through rectifier cell 152a. The drop in voltage in resistor 172, immediately brings the voltage of control grid 153 to a value which is slightly lower than $-V_1$, because the two sources 174 ($-V_3$) and 175 ($-V_1$) are at that moment in opposition in the circuit ground 169—175—170—172—173—152a—resistor 176—174—ground. During the time interval $t_8$, $(t_8+s)$, the negative leading edge $m_1n_1$ of the first $E_0$ impulse is therefore obtained.

Gate 6b of generator 6 includes an input 39, connected at 156 to output 79 of generator 5, and an input 178, which is connected to output 44 of $\overline{E_0}$ impulses, by connection 158—44a—160. It is seen that in normal functioning, at instant $(t_7+a)$, the two inputs of gate 6b are at zero voltage and that a $G_0$ impulse of $s$ time length will be obtained, while at instant $(t_8+a)$ input 178 will be at a voltage $-V_1$, which brings the grid of the pentode of amplifier 6a back to this same voltage $-V_1$. There will therefore be a $G_0$ impulse only for every two $F_0$ impulses.

By way of a non-restrictive example, Fig. 9 represents a form of realization of generators 8, 9 and 10, which furnish impulse trains $D_3$, $D_4$ and $D_5$, which are represented by Figs. 2 and 7. The connections which connect these three generators to one another and to generator 5, which creates $F_0$ and $\overline{F_0}$ impulse trains have already been summarized herein, as may be seen when consulting Fig. 1. The corresponding organs and connections in Figures 1 and 9, bear the same reference numbers. Each of the generators 8, 9 and 10, includes, as do generators 1, 2 (Fig. 3), and 7 (Fig. 5), a buffer, designated by the reference number of the generator, followed by sub index $c$, a gate, designated by sub index $b$, and an amplifier, designated by sub index $a$. The arrangement of amplifiers 8a, 9a, and 10a, is the same as for amplifier 1a. They are equipped with voltage limiters 199, 200, 201 respectively, which are similar to limiter 179 of amplifier 1a. Generator 5 supplies the gates and buffers of the three generators with $F_0$ impulses, by its output 79, and by its output 80, supplies $\overline{F_0}$ impulses. Gate 10b of generator 10, has three inputs 186, 187, and 188, and a derivation line 192, which is connected to source 193, of voltage $+V_2$, by a resistor 194. Input 186 receives by connection 55d, the $D_4$ impulses delayed by a time $p$ (Fig. 7) by delay line 49a, input 187 receive the $F_0$ impulses by its connection 57d, and input 188 is connected to control grid 188a of pentode 188 of amplifier 10a, as well as input 191 of buffer 10c.

This buffer 10c, also has three inputs, 189, 190, 191, and a line 195, connected to a source 196, of a voltage $-V_5$, through a resistor 197. Input 189 receives the $\overline{F_0}$ impulses through the connection 56b, input 190 receives the $\overline{D_5}$ impulses by connection 58b, these $\overline{D_5}$ impulses, being delayed by $p$ (Fig. 7) by delay line 54a. In the rest period, that is, when generator 5 does not operate, the pentodes of amplifiers 8a, 9a and 10a furnish an anodic current. If it is assumed that at instant $t_9$, the first $F_0$ impulse, numbered $L_4$, in Fig. 7, arrives at gate 10b, the production of the first $m_2$ impulse of train $D_5$ can only be realized if at the same instant, as a result of an exceptionally strong variation of electronic flux in pentode 198 of amplifier 9a, input 186 of this gate is at a zero voltage. Since at this instant, input 188 between 0 v. and $-V_1$ volts, as has been shown for input 98 of gate 1b, source 193 suddenly supplies current to rectifier cell 202 through input 188, and immediately brings grid 188a to a zero voltage. Examination of the diagram of the H₄ train of Figure 7, deducted from train $\overline{D_5}$, by a lag p, shows that feedback network 203, 204, 205, 206, of amplifier 10a furnishes current to source 196, in parallel with input 189, from instant $t_{10}$ to instant $t_{11}$, which is the time when the second $\overline{F_0}$ impulse appears. From instant $t_{11}$ on, and during a time far less than s, the feedback network supplies current only to source 196, because input 186 and derivation line 192 of gate 10b are at a voltage of $-V_1$ during this time. The corresponding drop in voltage in resistor 205 momentarily brings the voltage of grid 188a back to a value of less than $V_1$.

If contrary to the hypothesis formulated herein, it is assumed that the first $F_0$ impulse takes place well before instant $t_9$, and if the steady state operation of generator 8 is examined, at instant $t_7$, it is seen that impulse $k_1$ of train $H_3$ is at that moment transmitted to gate 8b, at the same time as impulse $p_1$ of train $F_0$. This coincidence gives rise to impulse $g_3$ of train $D_3$. The end $m_sp_2$ of this impulse, from instant $t_8$ to instant $(t_8+s)$, is caused by the coincidence of the train $\overline{F_0}$ impulse which corresponds to impulse $h_3$ of train $F_0$, with the absence of an impulse in the $H_3$ train. At instant $t_8$, which marks the beginning of aforementioned impulse $h_3$, a $g_4$ impulse of train $D_4$ is produced in generator 9 as a result of the coincidence of impulse $h_3$ of train $F_0$ with impulse $g_3$, delayed by p by delay line 45a.

At instant $(t_9 = t_8 + 4T)$, impulse $m_2$ of train $D_5$, which has been assumed to be the first, is brought about by the coincidence of impulse $L_4$ of train $F_0$ with impulse $m_4$ of train $H_2$. The end of this $m_2$ impulse is caused by the coincidence of an impulse of train $\overline{F_0}$ with the absence of an $H_4$ impulse. The cycle is then repeated indefinitely.

The arrangement diagram and the manner of operation of the four generators 11, 12, 13, 14 which furnish impulse trains $E_1$, $E_2$, $E_3$ and $E_4$ of Figure 2 respectively, is not described in detail in the present description. Actually, the indications given in Figure 1 are quite sufficient for entirely reconstructing the arrangement, if it is known that the amplifiers, the gates and the buffers of the generators in question are absolutely identical to those of generators 8 to 10.

These generators allow for obtaining impulses of which the time length is equal to 0.00013 sec. and the period of repetition 0.00052 sec. This period corresponds to a frequency of 1923 cycles.

It is evident that generators 1 to 14 shown in Fig. 1 when taken together, permit the timing impulse trains represented in Fig. 2 to be obtained, these trains being utilized in the operation of an "Electronic Calculator." This machine is the object of the U. S. patent application Serial No. 311,072, filed on September, 23, 1952.

It goes without saying that the machine herein described may be modified in a number of ways, without departing from the scope of the invention. One particular modification could be to increase the number of stages of multipliers inserted between generator 1 and generator 5, thereby obtaining E impulses of a repetition frequency considerably lower than those which make up the example of realization which has been chosen.

I claim:

1. Pulse producing system comprising a device fed by a pair of pilot periodic pulse trains having the same recurrence frequency, each pulse of a said train being simultaneous and of opposite polarity with a pulse of the other train of the same pair, said system generating a pair of output periodic pulse trains having the same recurrence frequency submultiple of those of the said pilot trains, each pulse of a said output train being simultaneous and of opposite polarity with a pulse of the other train of said pair, this said device comprising an amplifier with two outputs and generating said output pulse trains, a first gating circuit with two inputs and one output, a first input of which is fed by said first pilot train and the second input of which is connected to a second output of said amplifier across a delay circuit, a first buffer circuit with two inputs and one output, a first input of which is fed by said second pilot train and the second input of which is connected to the second input of said first gating circuit, a second gating circuit with two inputs and one output, a first input of which is connected to the output of the said first buffer circuit and the second input to the first output of said amplifier, a second buffer circuit with two inputs and one output, the first input of which is connected to the output of the first gating circuit and the second input to the output of said second gating circuit, the output of said second buffer circuit being connected to the input of the said amplifier.

2. Pulse producing system comprising a device fed by a pair of pilot periodic pulse trains having the same recurrence frequency, each pulse of a said train being simultaneous and of opposite polarity with a pulse of the other train of the same pair, said system generating a pair of output periodic pulse trains having the same recurrence frequency submultiple of those of the said pilot trains, each pulse of a said output train being simultaneous and of opposite polarity with a pulse of the other train of said pair, this said device comprising an amplifier with two outputs generating said output pulse trains, a gating circuit with two inputs and one output, a first input of which is fed by said first pilot train and the second input of which is connected to a second output of said amplifier across a delay circuit, a buffer circuit with two inputs and one output, a first input of which is fed by said second pilot train and the second input of which is connected to the second input of said gating circuit, a first rectifier connected between the output of said gating circuit and the input of said amplifier in such a manner that it is non conducting on the way from said amplifier to said gating circuit, a second rectifier connected between the output of said buffer and the input of said amplifier circuit in such a manner that it is conducting on the way from said amplifier to said buffer circuit, a feed-back circuit coupled with the anode circuit of an electronic tube of said amplifier and connected with the input of said amplifier.

3. Pulse producing system comprising a device fed by a pair of pilot periodic pulse trains having the same recurrence frequency, each pulse of a said train being simultaneous and of opposite polarity with a pulse of the other train of the same pair, said system generating n pairs of output periodic pulse trains, in which n is any integer, said pairs of output periodic pulse trains having the same recurrence frequency submultiple of those of said pilot trains, each pulse of a said output train being simultaneous and of opposite polarity with a pulse of the other train of the same pair, the pulses of all said output trains having the same form factor with a phase-shift of $$\frac{2\pi}{n}$$

from a pair to the following one, said device comprising n circuit units, each circuit unit comprising an amplifier, a first and a second gating circuit and a first and a second buffer circuit, all said first buffer circuits and $(n-1)$ of said first gating circuit having two inputs and one output whereas one gating circuit has n inputs and one output, the outputs of said first gating circuit and buffer circuit being respectively connected to a first input of said second buffer circuit and said second gating circuit, the output of the second gating circuit being connected to the second input of the second buffer circuit and the output of the second buffer circuit to the input of an amplifier provided with two outputs coinciding with the outputs of the corresponding unit circuit and delivering one of said pair of output periodic pulse trains, an output called second output of said unit circuit being connected with said second input of said second gating circuit, said first pilot train feeding a first one of said inputs of said $n$ gating circuits and said second pilot train a first one of said inputs of said $n$ buffer circuits, a first output of said $(n-1)$ first circuit units being connected across a delay circuit to the second input of each of said first gating circuit and said first buffer circuit of the following circuit unit, the second output of said first circit unit being connected across a delay circuit to the second input of said first buffer circuit of said first circuit unit, the $(n-1)$ second outputs of said first, second, . . . $(n-1)$th circuit units being connected across a delay circuit respectively to the second, third . . . $n$th inputs of said first gating circuit of said first circuit unit.

4. Pulse producing system comprising a device fed by a pair of pilot periodic pulse trains having the same recurrence frequency, each pulse of a said train being simultaneous and of opposite polarity with a pulse of the other train of the same pair, said system generating $n$ pairs of output periodic pulse trains, in which $n$ is any integer, said pairs of output periodic pulse trains having the same recurrence frequency submultiple of those of said pilot trains, each pulse of a said output train being simultaneous and of opposite polarity with a pulse of the other train of the same pair, the pulses of all said output trains having the same form factor with a phase-shift of $$\frac{2\pi}{n}$$

from a pair to the following one, said device comprising $n$ circuit units, each circuit unit comprising an amplifier, a gating circuit and a buffer circuit, all said buffer circuits and $(n-1)$ of said gating circuits having two inputs and one output, whereas one gating circuit has $n$ inputs and one output, a first rectifier connected between the output of said gating circuit and the input of said amplifier in such a manner that it is non conducting on the way from said amplifier to said gating circuit, a second rectifier connected between the output of said buffer circuit and the input of said amplifier in such a manner that it is conducting on the way from said amplifier to said buffer circuit, a feed-back circuit coupled with the anode circuit of one electronic tube of said amplifier and connected with the input of said amplifier said first pilot train feeding a first one of said inputs of said gating circuits and said second pilot train a first one of said inputs of said buffer circuits, a first output of said $(n-1)$ first circuit units being connected across a delay circuit to the second input of each said gating circuit and said buffer circuit of the following circuit unit, the second output of said first circuit unit being connected across a delay circuit to said second input of said buffer circuit of said first circuit unit, the $(n-1)$ second outputs of said first, second . . . $(n-1)$th circuit units being connected across a delay circuit respectively to the second, third . . . $n$th inputs of said gating circuit of said first circuit unit.

5. Pulse producing system comprising a device fed by a pair of pilot periodic pulse trains having the same recurrence frequency, each pulse of a said train being simultaneous and of opposite polarity with a pulse of the other train of the same pair, said system generating $n$ pairs of output periodic pulse trains, in which $n$ is any integer, said pairs of output periodic pulse trains having no phase shift in relation one to the other and their recurrence periods being respectively equal to 2T, 4T, 8T, . . . $2^nT$, where T is the recurrence period of said pilot trains, said device comprising $n$ circuits units, each circuit unit comprising an amplifier, a first and a second gating circuit and a first and a second buffer circuit, all said first buffer circuits and first gating circuits of the $p$th circuit unit having $(p+1)$ inputs and one output, the outputs of said first gating circuit and said first buffer circuit being respectively connected to a first input of said second buffer circuit and said second gating circuit, the output of the second gating circuit being connected to a second input of the second buffer circuit and the output of the second buffer circuit to the input of an amplifier provided with two outputs coinciding with the outputs of the corresponding unit circuit and delivering any said pair of output periodic pulse trains, a second output of said unit circuit being connected with the second input of said second gating circuit, said first pilot train feeding a first one of said inputs of $n$ first gating circuits and said second pilot train a first one of said inputs of said $n$ first buffer circuits, the $p$ other inputs of said first gating circuit of the $p$th circuit unit being connected across a delay circuit respectively to a second one of said outputs of said $p$ first circuit units and the $p$ other inputs of the first buffer circuit of said $p$th circuit unit being connected across a delay circuit respectively to the first outputs of said $(p-1)$ first circuit units and to the second output of said $p$th circuit unit.

6. Pulse producing system comprising a device fed by a pair of pilot periodic pulse trains having the same recurrence frequency, each pulse of a said train being simultaneous and of opposite polarity with a pulse of the other train of the same pair, said system generating $n$ pairs of output periodic pulse trains, in which $n$ is an integer, said pairs of output periodic pulse trains having no phase shift in relation one to the other and their recurrence periods being respectively equal to 2T, 4T, 8T . . . $2^nT$ where T is the recurrence period of said pilot trains, said device comprising $n$ circuit units, each circuit unit comprising an amplifier, a gating circuit and a buffer circuit, all said buffer circuits and said gating circuits of the $p$th circuit unit having $(p+1)$ inputs and one output, a first rectifier connected between the output of said gating circuit and the input of said amplifier in such a manner that it is non conducting on the way from said amplifier and to said gating circuit, a second rectifier connected between the output of said buffer circuit and the input of said amplifier in such a manner that it is conducting on the way from said amplifier to said buffer circuit, a feed-back circuit coupled with the anode circuit of one electronic tube of said amplifier and connected with the input of said amplifier, said first pilot train feeding a first one of said inputs of said gating circuits and said second pilot train a first one of said inputs of said buffer circuits the $p$ other inputs of said gating circuit of the $p$th circuit unit being connected across a delay circuit respectively to a second one of said outputs of said $p$ first circuit units and the $p$ other inputs of the buffer circuit of said $p$th circuit unit being connected across a delay circuit respectively to the first outputs of said $(p-1)$ first circuit units and to the second output of said $p$th circuit unit.

7. A pulse producing system according to claim 1 in which said output periodic pulse trains are generated in two circuits fed by a source of direct voltage and inductively coupled with the anode circuit of the output electronic tube of said amplifier.

8. A pulse producing system according to claim 2 in which said output periodic pulse trains are generated in two circuits fed by a source of direct voltage and inductively coupled with the anode circuit of the output electronic tube of said amplifier.

9. A pulse producing system according to claim 3 in which said output periodic pulse trains are generated in two circuits fed by a source of direct voltage and inductively coupled with the anode circuit of the output electronic tube of said amplifier.

10. A pulse producing system according to claim 4 in which said output periodic pulse trains are generated in two circuits fed by a source of direct voltage and inductively coupled with the anode circuit of the output electronic tube of said amplifier.

11. A pulse producing system according to claim 5 in which said output periodic pulse trains are generated in two circuits fed by a source of direct voltage and inductively coupled with the anode circuit of the output electronic tube of said amplifier.

12. A pulse producing system according to claim 6 in which said output periodic pulse trains are generated in two circuits fed by a source of direct voltage and inductively coupled with the anode circuit of the output electronic tube of said amplifier.

References Cited in the file of this patent
UNITED STATES PATENTS

| | | |
|---|---|---|
| 2,557,729 | Eckert | June 19, 1951 |
| 2,590,950 | Eckert et al. | Apr. 1, 1952 |
| 2,621,295 | Lacy | Dec. 9, 1952 |
| 2,632,880 | Flowers | Mar. 24, 1953 |
| 2,670,445 | Felker | Feb. 23, 1954 |
| 2,673,293 | Eckert et al. | Mar. 23, 1954 |
| 2,693,907 | Tootill | Nov. 9, 1954 |

UNITED STATES PATENT OFFICE

CERTIFICATE OF CORRECTION

Patent No. 2,777,945                                                      January 15, 1957

Henri Gerard Feissel

It is hereby certified that error appears in the printed specification of the above numbered patent requiring correction and that the said Letters Patent should read as corrected below.

Column 13, line 1, for "second output" read -- first output --; lines 3 and 5, after "said n", each occurrence, insert -- first --; line 9, for "circit" read -- circuit --; line 45, after "amplifier" insert a comma; column 14, line 8, for "second output" read -- first output --; line 47, after "circuits" insert a comma.

Signed and sealed this 12th day of November 1957.

(SEAL)
Attest:

KARL H. AXLINE
Attesting Officer

ROBERT C. WATSON
Commissioner of Patents